US009281727B1

(12) United States Patent
Coley et al.

(10) Patent No.: US 9,281,727 B1
(45) Date of Patent: Mar. 8, 2016

(54) USER DEVICE-BASED CONTROL OF SYSTEM FUNCTIONALITY

(71) Applicant: Rawles LLC, Wilmington, DE (US)

(72) Inventors: Christopher D. Coley, Morgan Hill, CA (US); Menashe Haskin, Palo Alto, CA (US); Robert A. Yuan, Belmont, CA (US); Juli A. Satoh, San Jose, CA (US); William Thomas Weatherford, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 13/666,797

(22) Filed: Nov. 1, 2012

(51) Int. Cl.
G09G 5/00 (2006.01)
H02K 9/04 (2006.01)

(52) U.S. Cl.
CPC .......................... H02K 9/04 (2013.01)

(58) Field of Classification Search
CPC ......... G06F 3/017; G06F 3/013; G06F 3/005; G06F 3/011; G06F 1/163; G06F 2203/0384; G06F 1/1626; G06F 3/033; G06F 3/0346; G06F 3/0354; G06F 3/038; G06F 3/00; G06F 21/31; G06F 3/16; G06F 21/32; G06F 2203/04803; G06F 3/016; G06F 3/04842; G06F 3/04847; G06F 3/0488; G06F 3/165; G06F 15/18; G06F 17/274; G06F 17/28
USPC .......................................... 345/156, 168–181
See application file for complete search history.

(56) References Cited

U.S. PATENT DOCUMENTS

| 5,572,239 | A | * | 11/1996 | Jaeger | 345/172 |
|---|---|---|---|---|---|
| 6,690,618 | B2 | * | 2/2004 | Tomasi et al. | 367/127 |
| 7,418,392 | B1 | | 8/2008 | Mozer et al. | |
| 7,720,683 | B1 | | 5/2010 | Vermeulen et al. | |
| 7,774,204 | B2 | | 8/2010 | Mozer et al. | |
| 8,018,579 | B1 | * | 9/2011 | Krah | 356/4.01 |
| 2005/0212777 | A1 | * | 9/2005 | Ing et al. | 345/173 |
| 2006/0192763 | A1 | * | 8/2006 | Ziemkowski | 345/168 |
| 2011/0096036 | A1 | * | 4/2011 | McIntosh et al. | 345/177 |
| 2011/0191680 | A1 | * | 8/2011 | Chae et al. | 715/716 |
| 2011/0242059 | A1 | * | 10/2011 | Pasquero et al. | 345/177 |
| 2012/0223885 | A1 | | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

Primary Examiner — Duc Dinh
(74) Attorney, Agent, or Firm — Lee & Hayes, PLLC

(57) ABSTRACT

A user device may include one or more features on a surface of the user device, where a user may interact with the one or more features. In response to a user action with respect to one of the features, a particular sound, frequency, or change in frequency may be output. An augmented reality functional node (ARFN) may detect the sound or frequency and identify a particular operation that corresponds to the sound or frequency. The ARFN may then cause that operation to be performed within an environment.

28 Claims, 7 Drawing Sheets

USER DEVICE-BASED CONTROL OF SYSTEM FUNCTIONALITY

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth. In particular, a system may detect various voices of users within the environment and then interpret any commands that are being uttered by those users. However, it may be difficult to enable interaction with respect to a user when the audio is something other than a voice of a user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
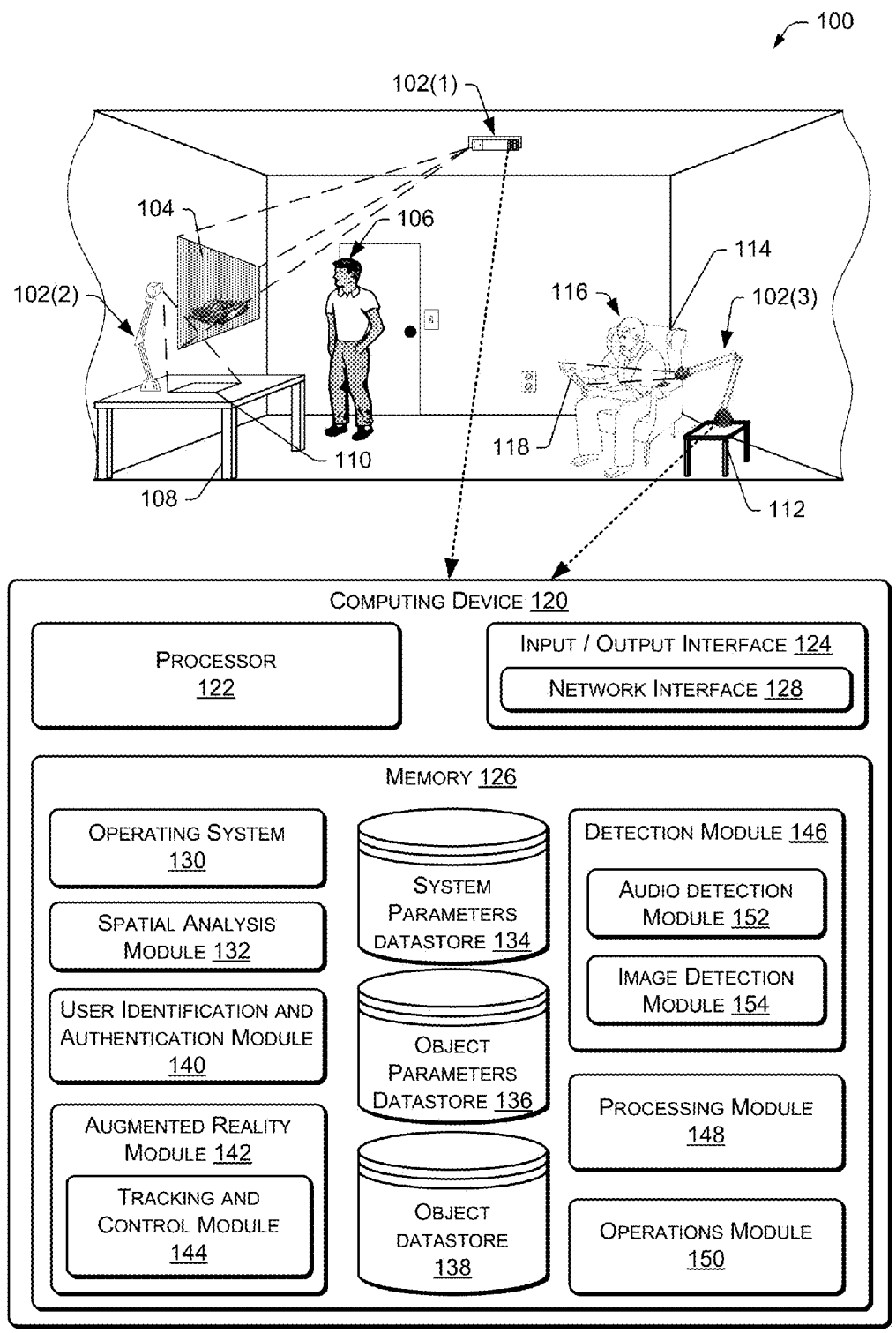
FIG. 1 shows an illustrative scene with an augmented reality environment hosted in an environmental area, such as a room. The augmented reality environment is provided, in part, by three projection and image capture systems that may be configured to perform certain operations in response to actions taken by a user.

This disclosure describes systems and/or processes for performing various operations within a scene or environment in response to user actions with respect to a user device. More particularly, the user device may correspond to a passive device or display medium (e.g., display surface) that generates a sound or a particular frequency when a user interacts with the user device. The sound or frequency may be generated in response to the user making physical contact with a feature of the user device, such as by the user swiping or touching a surface of the user device, or by the user actuating a button or a raised portion of the user device. In some embodiments, the sound or frequency may be generated based at least in part on the user touching or sliding a finger across one or more ridges or grooves (hereinafter, "grooves") set forth on the surface of the user device. Alternatively, or in addition to the user device outputting a sound or particular frequency, actions or gestures performed by the user may be captured as video or still images.

In various embodiments, one or more augmented reality functional nodes (ARFN) may detect the sounds or frequencies output by the user device. In response, the ARFN may determine one or more operations that are associated with the detected sounds or frequencies. The ARFN may have previously mapped certain sounds or frequencies to different operations that may be performed within the scene. For instance, a first detected sound may cause the ARFN to perform a first operation (e.g., adjust the volume of a device within the scene), a second detected sound may cause the ARFN to perform a second operation (e.g., open/close the drapes), and so on. Therefore, when the ARFN has determined that a particular sound or frequency output by the user device is associated with a particular operation, the ARFN may then cause that operation to be performed within the scene. As a result, via the ARFN, the user may cause different operations to be performed within an environment by performing different actions associated with the user device.

As stated above, the user device may be a passive device such as a display medium or a display surface. Moreover, the user device may include one or more features that cause the user device to output a sound or a particular frequency in response to a user interacting with those features. In some embodiments, the features may include one or more grooves in which a user may swipe a finger or another object across. The grooves may be evenly spaced with respect to one another or the grooves themselves may each be the same width. In other embodiments, the distance between the grooves, or the width of the grooves, may vary, such as the space between the grooves being incrementally increased or decreased. The features may also include different sets of grooves that each correspond to a different operation that may be performed by the ARFN. In certain embodiments, one or more visuals may be overlaid on the user device, where contact with the regions associated with those visuals may cause the ARFN to perform a certain operation. One or more buttons (e.g., push-button clickers), knobs (e.g., rotary knobs), switches domes of various shapes or sizes, etc., of the user device may also cause the user device to output a particular sound or frequency when the user interacts with those portions of the user device.

In various embodiments, augmented reality environments may allow users to interact with physical and virtual objects in a physical space. Augmented reality environments may be formed through systems of resources such as cameras, projectors, computing devices with processing and memory capabilities, and so forth, which may perform the processes described above and set forth below. The projectors may project images onto the surroundings that define the environment or may cause various operations to be performed within the environment. Moreover, the cameras and microphones may monitor and capture user interactions with devices (passive or otherwise) associated with the users.

An augmented reality environment may be commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

FIG. 1 shows an illustrative augmented reality environment 100 created within a scene, and hosted within an environmental area, which in this case is a room. Three ARFNs 102(1)-(3) are shown within the room. Each ARFN 102 contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. In addition, the ARFN 102(1) may detect actions taken by a user within the room (e.g., gestures) or sounds output by a device associated with the user. In response, the ARFN 102(1) may identify operations associated with those sounds and cause those operations to be performed within the room. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a user device 118. The third ARFN 102(3) projects images onto the surface of the user device 118 for the user 116 to consume and interact. The projected images may be of any number of things, such as books, games (e.g., crosswords, Sudoku, etc.), news, magazines, movies, browser, etc. The user device 118 may be essentially any device for use within an augmented reality environment, and may be provided in several form factors. It may range from an entirely passive, non-electronic, mechanical surface to a full functioning, full processing, electronic device with a projection surface. For instance, the user device 118 may be a display surface or display medium that includes one or more features that a user may interact with. When actuated by a user, the features (or the user device 118 itself) may output a particular sound or frequency, which may be detected by one of the ARFNs 102.

These are just sample locations. In other implementations, one or more ARFNs may be placed around the room in any number of arrangements, such as on in furniture, on the wall, beneath a table, and so forth.

Associated with each ARFN 102(1)-(3), or with a collection of ARFNs 102, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a three-dimensional (3D) model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

In addition, the object datastore 138 may maintain a library of sounds or particular frequencies that are associated with different operations that may be performed within the environment. As a result, upon one of the ARFNs 102 detecting a particular sound or frequency within the environment, the ARFN may identify a corresponding operation (e.g., adjust volume, project an image, etc.) and then cause that operation to be performed.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

In addition, and as stated above, the memory 126 may maintain, or may be otherwise associated with, a detection module 146, a processing module 148, and an operations module 150. As shown, the detection module 146 may include an audio detection module 152 and an image detection module 154. In various embodiments, a user 106 may interact with one or more features of the user device 118 for the purpose of causing one or more operations to be performed within the environment. As stated above, the features may correspond to a set of grooves or ridges in which a user may slide or swipe a hand, finger, or another object across. User actuation with respect to these features may cause the user device 118 (or the features) to output a particular sound or frequency. The detection module 146, and the audio detection module 152 in particular, may detect (e.g., via a microphone) such sounds or frequencies for further processing. In other embodiments, the image detection module 154 may detect one or more actions or gestures performed by the user 106 via a camera (e.g., a still image camera or a video camera). For the purposes of this discussion, the sounds, frequencies, or images output by the user device 118 and detected by the detection module 146 may be referred to as "output."

Upon detecting the particular sound or frequency output by the user device 118, the processing module 148 may determine one or more operations that are associated with the detected output. In particular, the ARFN 102 may maintain or be associated with a database that maps various sounds, frequencies, and/or user actions to particular operations that may be performed within the environment. That is, in response to the user 106 performing some action with respect to the user device 118, which may then output a particular sound or frequency, the processing module 148 may identify a specific operation that corresponds to that sound or frequency. For instance, the user 106 swiping across the grooves of the user device 118 in a particular direction may cause the ARFN 102 to adjust the lighting of the room, to open/close the drapes, to turn the page of an electronic book ("e-book"), etc. As a result, the user 106 may perform certain user actions with respect to the user device 118 for the purpose of causing intended operations to be performed.

Once the operation(s) associated with the detected sound or frequency has been identified by the processing module 148, the operations module 150 may cause that operation to be performed within the environment. Accordingly, the ARFN 102 may cause certain operations to be performed in response to detecting a particular sound or frequency within the environment, which may be caused by a user 118 interacting with a passive user device 118, such as a display surface or medium.

Figure 2:
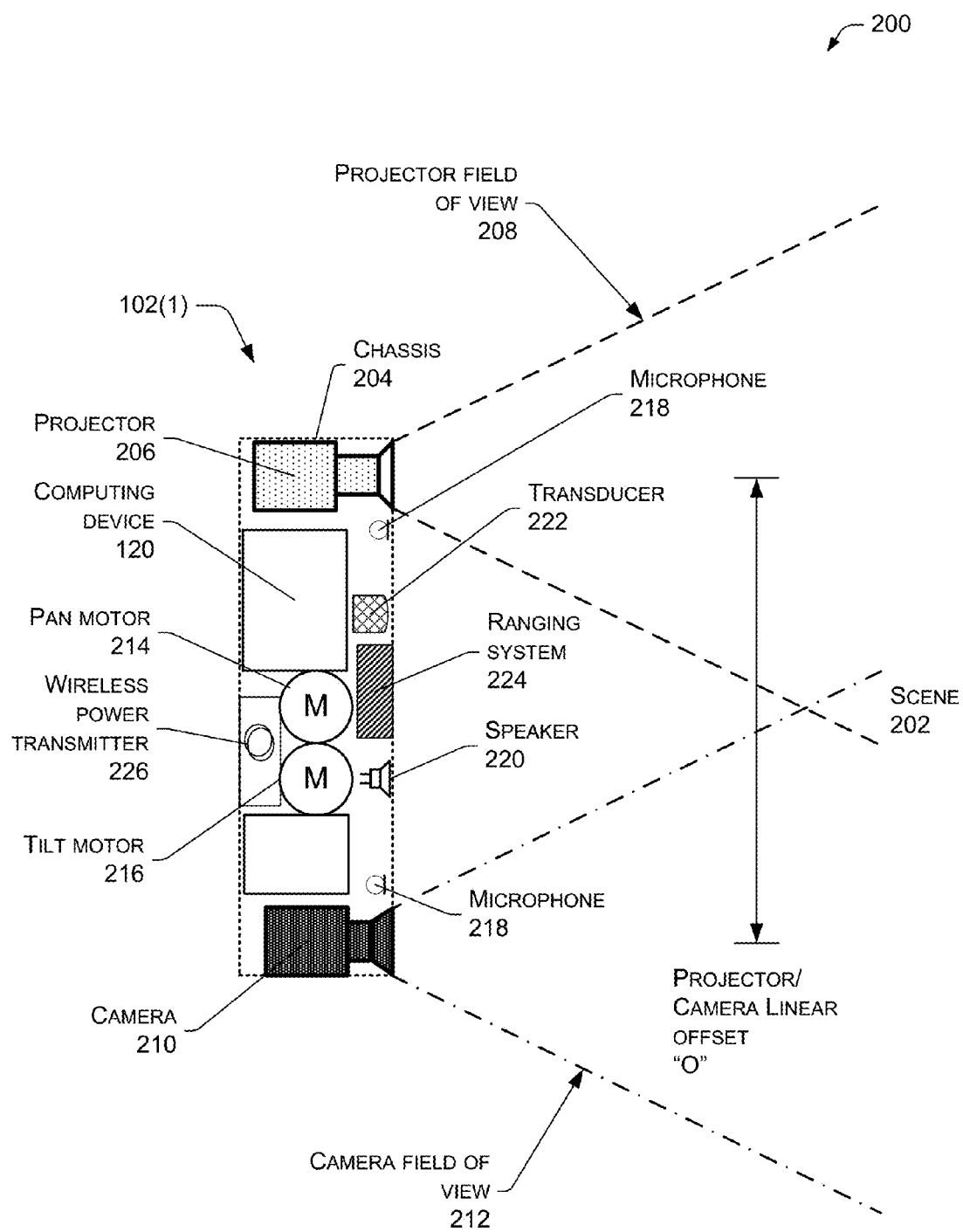
FIG. 2 shows a first implementation of a projection and image capturing system formed as an augmented reality functional node having a chassis to hold a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth. In addition, the ARFN 102(1) may include one or more components, modules, or associated devices that are configured to perform one or more operations within the scene 202 based at least in part on sounds or frequencies detected by the ARFN 102(1). In some embodiments, the sounds or frequencies may be output in response to a user 106 interacting with one or more features of a passive user device 118.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) 210 and used for 3D reconstruction and modeling of the environment. The projector 206 may comprise a micro-laser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera 210 may be embodied a red, green, blue (RGB) camera 210. In other instances, the camera 210 may include time of flight (ToF) sensors. In still other instances, the camera 210 may be a red, green, blue, z-depth (RGBZ) camera 210 that includes both ToF and RGB sensors. The camera 210 has a camera field of view 212 which describes a particular solid angle. The camera field of view 212 may vary according to changes in the configuration of the camera 210. For example, an optical zoom of the camera 210 may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 132 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene and/or the user device 118. For example, the user may make a particular noise, such as a tap on a wall or snap of the fingers, which are pre-designated to initiate an augmented reality function. The user may alternatively use voice commands. The user may also interact with the user device 118, which may cause the user device 118 to output particular sounds or frequencies. Such audio inputs may be located within the scene using time-of-arrival differences among the microphones and used to summon an active zone within the augmented reality environment. Further, the microphones 218 may be used to receive voice input from the user for purposes of identifying and authenticating the user.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as non-passive user device 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
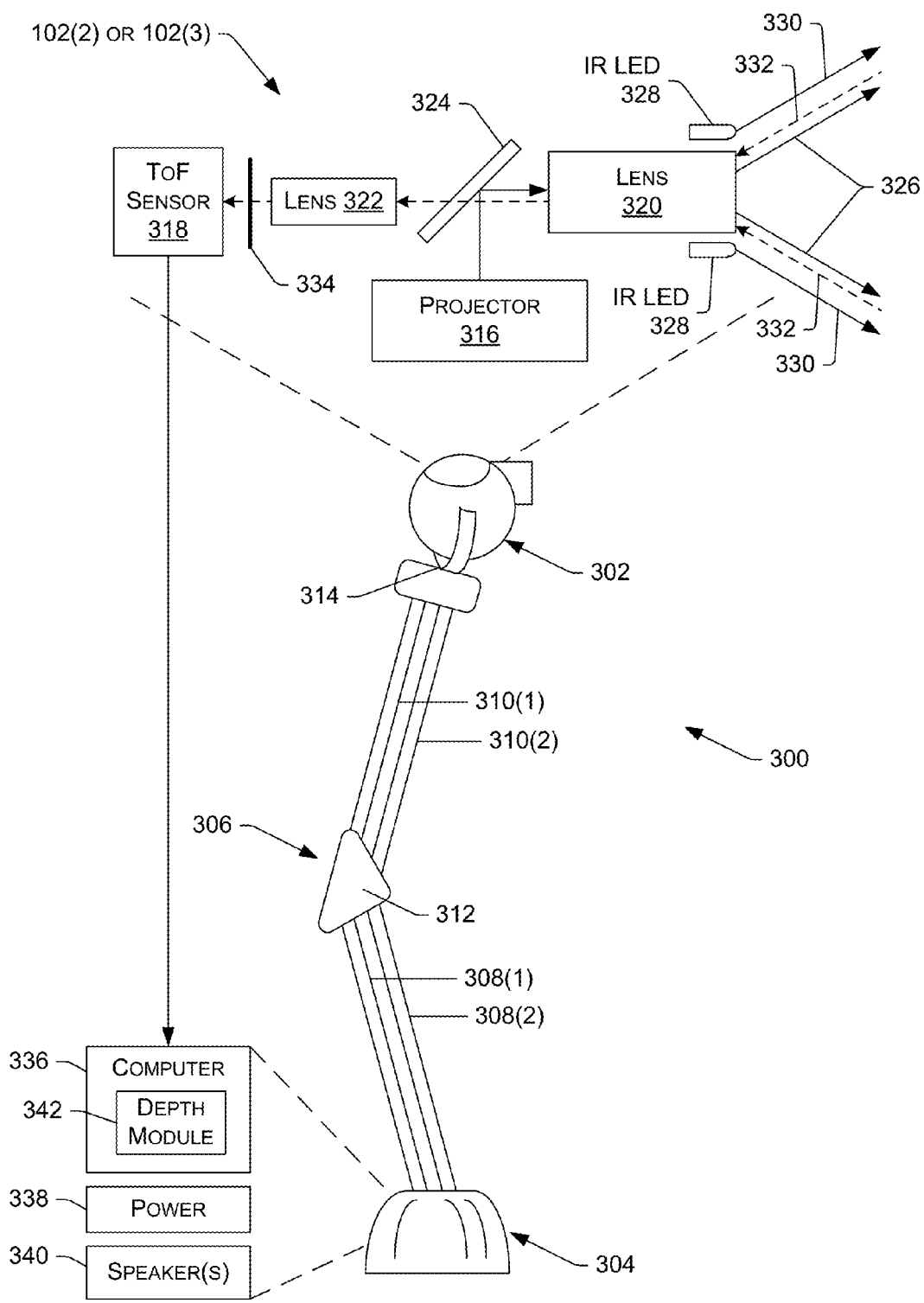
FIG. 3 shows a second implementation of a projection and image capturing system formed as a familiar type of furniture, such as a table lamp. In this implementation, the projector and camera share a common optical path through a common lens.

FIG. 3 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 300 has a head 302 attached to a base 304 by a movable arm mechanism 306. As illustrated, the arm mechanism 306 has two base members or rods 308(1) and 308(2) connected to two head members or rods 310(1) and 310(2) via a joint connector 312. Other configurations of the arm mechanism 306 may be used. In the illustrated implementation, the head 302 is connected to the arm mechanism 306 via a universal connector 314 that enables at least two degrees of freedom (e.g., along tilt and pan axes). The universal connector 314 is described below in more detail with reference to FIG. 6. In other implementations, the head 302 may be mounted to the arm mechanism 306 in a fixed manner, with no movement relative to the arm mechanism 306, or in a manner that enables more or less than two degrees of freedom. In still another implementation, a pan may be coupled to the base 304 to enable rotation of the arm mechanism 306 and the head 304.

The head 302 holds several components, including a projector 316 and a ToF sensor 318. In this example, the ToF sensor 318 measures IR signal reflections from objects within the scene. The ToF sensor 318 may be implemented as a standalone sensor, or as part of a camera 210. The head also contains one or more lenses, including a first lens 320 and a second lens 322. The first lens 320 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 320 may further include a motorized focus, a motorized zoom, and a motorized iris.

The second lens 322 is provided to adjust for the differences between the projection imager and the ToF imager. This allows for the device to set relative coverage of the two imagers (e.g., overscan/underscan).

The projector 316 projects an image that is reflected off an angled beam splitter 324 and out through the lens 320. The beam splitter 324 may be, for example, embodied as a dichroic beam splitter having a coated prism assembly that employs dichroic optical coatings to divide light. The projected image has a field of view represented by the outgoing pair of arrows 326. In this manner, the visible and high intensity light from the projector can be zoomed for image projection on a wide range of surfaces, from near view to far view surfaces.

One or more IR emitters 328, such as IR LEDs, are positioned in the head 302 relative to the lens 320. The IR emitters 328 direct IR light in the direction of the projected image to illuminate the scene onto which the images are being projected. The IR emitters 328 may be arranged such that the illumination field is wider than the projected field, as represented by the outgoing pair of arrows 330.

The IR signals are scattered from objects in the scene and returned to the lens 320, as represented by the incoming pair of arrows 332. The captured IR signals are passed through the lens 320 and through the dichroic beam splitter 324 to the secondary lens 326. The IR signals are then optionally passed through an IR filter 334 (or other filter type) to the ToF sensor 318. In other implementations, the IR signals may be passed directly from the lens 322 to the ToF sensor 318, without going through the IR filter 334. Accordingly, the IR signals are emitted out from the head 302, scattered by the objects, and collected by the head 302 for capture by the ToF sensor 318 as a way to image the scene. This technique is performed in lieu of using structured light, as implemented in the implementation of the first ARFN 102(1).

It is noted that, in other implementations, the projector 316 may be arranged to project an image that is passed through the beam splitter 324 and out through the lens 320, rather than being reflected by the beam splitter 324. In this arrangement, the returning IR signals maybe received back through the lens 320 and reflected by the beam splitter 324 to the lens 322 and ToF sensor 318. Said another way, the projector 316 and IR components (i.e., ToF sensor 318, lens 322 and optionally filter 334) may be swapped so that the returning IR signals are reflected by the beam splitter 324 rather than the projected image. Other arrangements may also be possible where at least part of the optical path is shared by the projection and depth capture.

The lamp-based ARFN 102(2) or 102(3) may also be equipped with one or more components in the base 304. In this example, a computer 336 resides in the base 304, along with power components 338 and one or more speakers 340. The computer may include processing and memory to execute instructions. A depth module 342 may be executed by the computer 336 to measure a time of flight for an IR signal (or other modulated light output). The time-of-flight value may be derived as a function of a time lapsed between emission from an IR LED 328 and capture by the ToF sensor 318. Alternatively, the time-of-flight value may be derived as a function of the phase difference between the modulated light output and the returned light. The depth module may be implemented in software or hardware. It is noted that in other implementations, the components shown as residing in the base 304 may reside in the head 302 or arm mechanism 306. For instance, the computer 336 may be located in the head, and the speakers may be 340 may be distributed in multiple locations, including the base, arm mechanism, and/or the head.

Notice that in this implementation of FIG. 3, the projector 316 and the sensor 318 share a common optical path through a common lens 320. As a result, the ARFN may be made more compact to a smaller form factor, as one set of lenses are removed in this design as compared to the offset design for FIG. 2.

Figure 4:
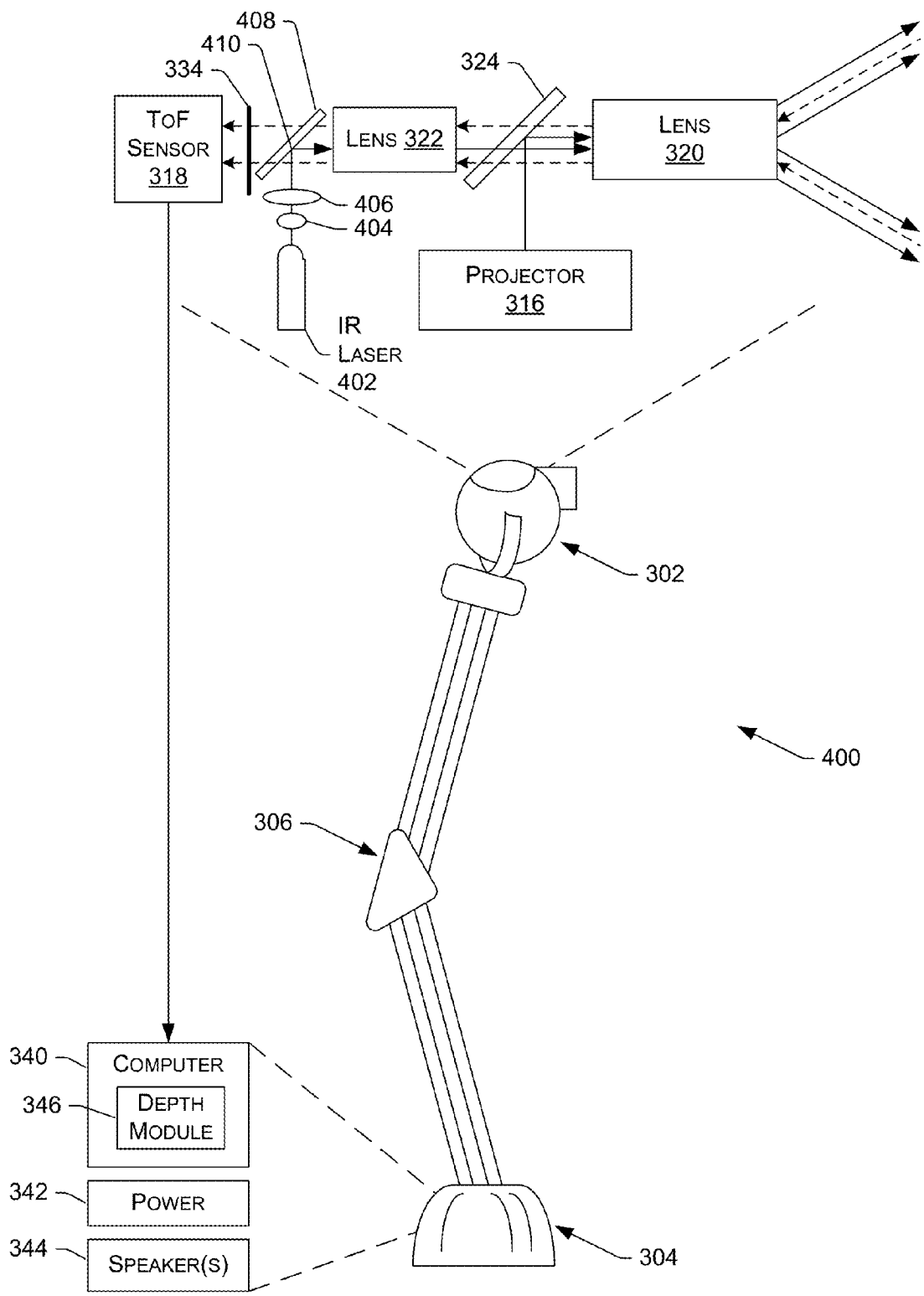
FIG. 4 shows a third implementation of a projection and image capturing system, which is formed as a table lamp similar to the embodiment shown in FIG. 3. In this implementation, the projector and camera share a common optical path through a common lens, and illumination components also share the same optical path.

FIG. 4 shows another implementation of the ARFN 102(2) or 102(3), also shown implemented as part of a table lamp 300. This implementation differs from that of FIG. 3 in that the illumination system also shares the same optical path as the projector 316 and the ToF sensor 318.

In FIG. 4, an IR laser 402 is used in place of the IR LEDs 328 of FIG. 3. The IR laser 402 outputs an IR beam that is expanded by a beam expander 404 and then concentrated by a focus lens 406 onto an angled beam splitter 408. In one implementation, the angled beam splitter 408 is formed of a material that passes light (e.g., glass) and has a reflective patch 410 at its center. The focus lens 406 concentrates the IR beam onto the reflective patch 410 of the beam splitter 408, which directs the beam through lens 322, through the beam splitter 324, and out through the lens 320. The reflective patch covers the center portion of the beam splitter 408 and may have any number of shapes, such as circular, oval, polygonal, and so forth. With this arrangement, the size and area of interest can be controllably illuminated by use of the lens 320 and modulated IR laser light. The illuminated area is roughly the same size, or slightly larger, than the area onto which images are projected, as is shown in more detail with reference to FIG. 5.

IR signals scattered from a populated landscape are then collected by the head 302 and passed back through the lens 320, through the beam splitter 324, through lens 322, through the non-reflective portion of the angled reflector 408, through the filter 334, and to the ToF sensor 318. Accordingly, the collected scattered IR light forms an image on the ToF sensor 318 that is used to compute time of flight values for depth analysis of the landscape of the scene.

One of the advantages of placing the IR laser 402 as shown and passing the IR beam through the lens system is that the power used for illumination may be reduced as compared to the implementation of FIG. 3, where the IR LEDs are external to the optical path. Illumination typically degrades inversely proportional to the square of the distance. In FIG. 3, the forward and return paths result in an illumination inversely proportional to the distance to the power of four. Conversely, illumination through the same lens means that the returned light is inversely proportional to square of the distance, and therefore can use less intense illumination to achieve the same results.

It is further noted that essentially any IR device may be used in these systems. Although IR LEDs and IR lasers are shown in the implementations of FIGS. 3 and 4, essentially any device that produces energy within the IR spectrum may be used, such as, for example, a regular red LED.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 5:
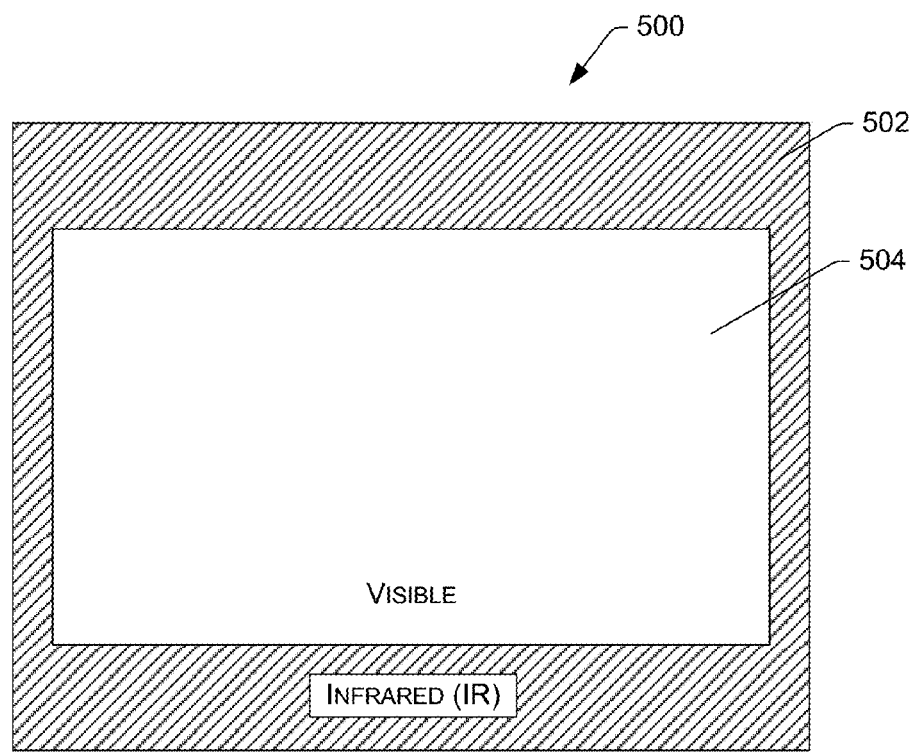
FIG. 5 shows a first area of illumination and a second area of image capture that may be realized by the implementations shown in FIGS. 3 and 4.

FIG. 5 shows a coverage pattern 500 provided by the ARFN 102(2) or 102(3). The coverage pattern 500 has an illumination area 502 covered by the IR-based illumination system. The coverage pattern 500 also has a projection area 504 covered by the projected image. As shown in this footprint, the illumination area 502 is larger than, and encompasses, the projection area 504. However, in other implementations, the illumination area 502 may be equal to or smaller than, and be encompassed by, the projection area 504. The second lens 322 in the device allows for adjustment in the relative coverage to enable overscan or underscan conditions.

Figure 6:
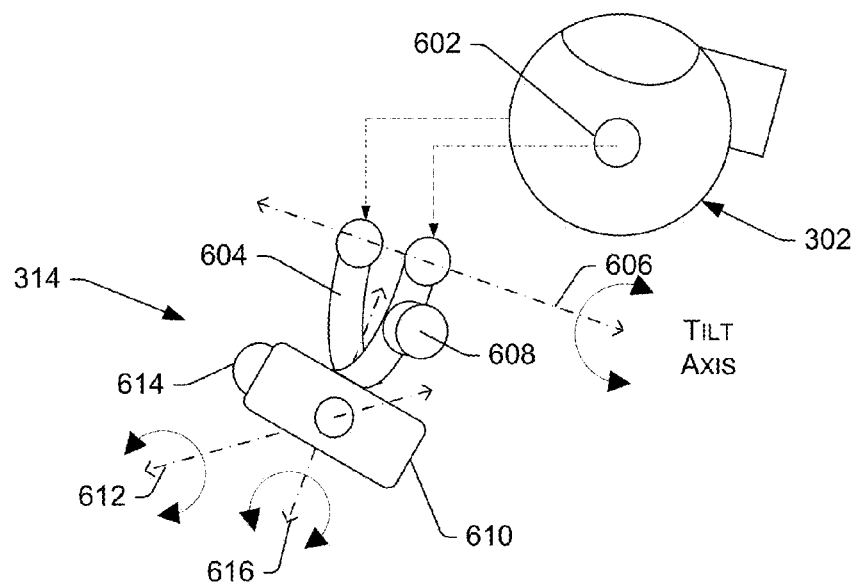
FIG. 6 shows an exploded view of a head and universal mount of the lamp implementation shown in FIGS. 3 and 4.

FIG. 6 shows an exploded view 600 of the head 302 and the universal mount 314 of the lamp implementation shown in FIGS. 3 and 4. Here, the head 302 is generally spherical, although it may be made of any shape, size or form factor. The head 302 has two mounting members 602 on opposing sides of the sphere. The mounting members 602 may be pivotally mounted within a U-shaped cradle 604 to facilitate rotation about a tilt axis 606. A tilt motor 608 may be included to move the head 302 about the tilt axis 606.

The U-shaped cradle 604 is movably mounted relative to structural bracket 610. The U-shaped cradle 604 may be pivoted about a pan axis 612. A pan motor 614 may be included to pivot the U-shaped cradle 604 and head 302 about the pan axis 612. Additionally, the U-shaped cradle 604 may be rotatable about an axis 616 to rotate or spin relative to the structural bracket 610.

Figure 7:
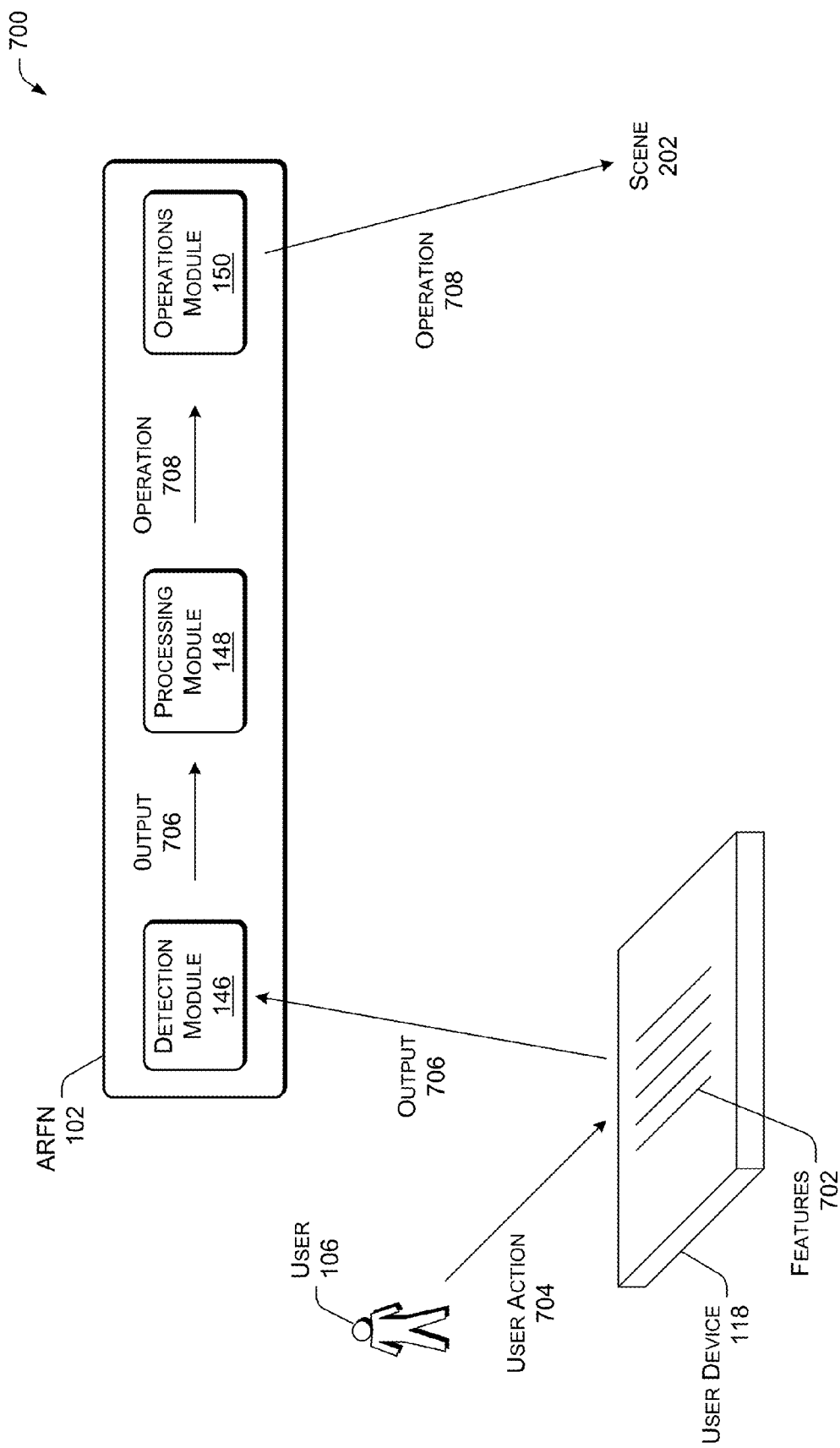
FIG. 7 shows an illustrative system for performing certain operations within a scene based at least in part on user actions with respect to features of a user device.

FIG. 7 illustrates a system 700 that performs one or more operations within an environment based at least in part on user actions with respect to a user device. More particularly, a user 106 may possess a user device 118 that may be used to control the functionality of objects or other devices within an environment. The user device 118 may correspond to a passive user device 118, such as a display medium or a display surface that lacks any electronic components. The user 106 may interact with the user device 118 in different manners in order to perform certain actions. That is, the user 106 may interact with one or more features of the user device 118, where each interaction may correspond to a different operation to be performed. For instance, the user 106 may perform a specific user action for the purpose of adjusting the lighting of the environment, opening/closing drapes, or adjusting the volume of a device, including one of the ARFNs 102, included within the environment.

As shown, the system 700 may include an ARFN 102 (or multiple ARFNs 102), a user 106, and a user device 118. In various embodiments, the user device 118 may include one or more features 702, which may include one or more sets of grooves on a surface of the user device 118. As described below, the user device 118 may include any other features 702 in addition to, or instead of, grooves or ridges. In various embodiments, the user 106 may perform a particular user action 704 with respect to the user device 118, and with respect to the features 702 in particular. In response to the user 106 interacting with the features 702, such as moving or swiping a finger over the grooves, the user device 118 or the features 702 may cause an output 706 to be emitted. The output 706 may correspond to sounds or a particular frequency output in association with the user device 118 or the features 702. For instance, provided that the features 702 are a set of grooves, the output 706 may correspond to a frequency or a change in frequency that is output when the user 106 swipes a finger across the grooves.

The detection module 146 of the ARFN 102 may detect the output 706, such as by using one or more microphones 218 that may capture the sound or frequencies output in association with the user device 118. The detection module 146 of the ARFN 102 may also detect the output 706 utilizing or one or more cameras 210 that capture one or more images that identify the user actions 704 (e.g., user gestures, etc.).

The processing module 148 may process the output 706 in order to identify one or more operations 708 that correspond to the output 706. In some embodiments, the ARFN 102 may maintain, or have access to, a database that maps different outputs 706 (e.g., sounds, frequencies, change in frequencies, user actions 704, etc.) to different operations 708 (e.g., adjust brightness, adjust volume, open/close drapes, etc.). That is, the database may indicate the operation 708 that corresponds to the user action 704, which may reflect an operation 708 that the user 106 would like to occur. For instance, the user 106 may touch the features 702 of the user device 118 in a certain manner or direction for the purpose of causing an intended operation 708 to occur. Based at least in part on the output 706 associated with the user action 704, the processing module 148 may determine the corresponding operation 708 that is to occur within the scene 202.

Upon identifying the operation 708 intended by the user 106, the operations module 150 may cause that operation 708 to occur within the scene 202. In various embodiments, the operation 708 may be performed by a projector 206 of the ARFN 102 outputting a light or image that causes the operation 708 to occur. For instance, in response to a particular user action 704 and detecting a corresponding output 706, the ARFN 102 may output a light or image that is directed at a television in order to adjust the volume of the television. Likewise, the ARFN 102 may output a light or image that causes the brightness of a light (e.g., a lamp) to increase or decrease. In addition, the operation 708 may correspond to an action performed by the ARFN 102 or an application/software associated with the ARFN 102, such as projecting an image within the scene 202. That is, upon determining the operation 708 to be performed, the ARFN 102 may perform that operation 708, or cause that operation 708 to be performed, independent of any other devices within the scene 202. In these instances, the user 106 may perform a specific user action 704 with respect to the features 702 that causes those particular operations 708 to occur within the scene 202.

In various embodiments, the features 702 included on the user device 118 may be a single set of passive ridges situated on a surface of the user device 118. In some embodiments, the passive ridges may be depressions, protrusions, raised portions, ridges, channels, grooves, or any other passive elements on the surface of the user device 118. As the user 106 slides or swipes a finger (e.g., or fingernail, or thumb, an object, etc.) across the passive ridges, a particular frequency may be output. The frequency output may depend upon the spacing between the passive ridges, the width or thickness of the passive ridges, the height of the passive ridges, the direction of the swipe, the distance of the swipe, and/or the velocity of the user's 106 finger as it is being swiped across the passive ridges.

For instance, the distance between the passive ridges, the height of the passive ridges, or the width (e.g., thickness) of the passive ridges may be the same. In this case, the frequency output may be based at least in part on the velocity, distance, and/or the direction in which the user 106 is sliding a finger on or across the passive ridges. As a result, the user 106 sliding a finger at a first velocity and at a second, different velocity may cause two different frequencies to be output, which may cause the ARFN 102 to perform a first operation 708 and a second, different operation 708, respectively. Similarly, a user 106 sliding a finger in different directions may cause different frequencies to be output, which may again cause the ARFN 102 to perform two different operations 708. Moreover, the user 106 sliding a finger for two different distances may cause two different frequencies to be output, which may cause the ARFN 102 to cause two different operations 708 to occur.

Moreover, the particular pattern in which the user 106 interacts with the features 702 (e.g., passive ridges) may also cause different sounds or frequencies to be output. That is, the user 106 may vary the direction or velocity of the swipes, which may cause different frequencies to be output. For example, the user 106 may swipe in a first direction (e.g., up), then a second direction (e.g., down), and then in another direction (e.g., up), or any combination thereof, in order to direct the ARFN 102 to perform a particular operation 708. The user 106 may also vary the velocity of multiple swipes (e.g., fast, fast, slow, or any combination thereof), which may again cause a different frequency to be output and detected by the ARFN 102. In response, the ARFN 102 may cause the operation 708 that corresponds to that pattern to occur.

In other embodiments, the height of the passive ridges, the distance between the passive ridges and/or the width of the passive ridges may vary. For instance, the height of the passive ridges, the distance between the passive ridges, or the width of the passive ridges may incrementally increase or decrease so the apparent frequency may change based on the direction in which the finger is sliding across the passive ridges. As a result, the detection module 146 may detect a change in the frequency of the sound, in which those changes in frequency may correspond to different operations 708 within the scene 202. In these embodiments, provided that the spacing between the passive ridges incrementally increased, the frequency of sound may appear to decrease as the finger slides along the passive ridges. However, if the finger slid across the passive ridges in the other direction (e.g., from the wider spacing to the narrower spacing), the frequency may appear to increase. An increase in the frequency may correspond to a first operation 708 intended by the user 106 (e.g., increase the volume) and a decrease in frequency may correspond to a second, different operation 708 intended by the user 106 (e.g., decrease the volume). In some embodiments, the frequency of sound may also vary based on the direction of the swipe and/or the velocity of the swipe.

Moreover, each of the passive ridges may output a particular sound or frequency of sound, which may be based on the material of the passive ridges, a texture of the passive ridges, and/or the dimensions (e.g., width, length, depth, etc.) of the passive ridges. As a result, since each passive ridge may output a particular sound or frequency of sound, a swipe across the passive ridges may cause a certain cadence to be output. The ARFN 102 may detect such a cadence and then cause a certain corresponding operation 708 to be performed.

The features 702 of the user device 118 may also include multiple sets of passive ridges, where each of the sets of passive ridges may correspond to a different operation 708. For instance, a first set of passive ridges may correspond to adjusting the volume of a device. The user 106 may then swipe the passive ridges in a first direction to increase the volume and swipe the passive ridges in a different direction in order to decrease the volume. As stated above, the volume may also be adjusted based on the direction, velocity, and pattern in which the first set of passive ridges are swiped. A second set of passive ridges may correspond to adjusting the lighting the scene 202 and various user actions 704 with respect to the second set of passive ridges may cause different operations 708 associated with the lamp (e.g., turn on/off, adjust brightness, etc.).

One or more visuals (e.g., images, text, etc.) may also be overlaid on the user device 118 and may serve as the features 702. In various embodiments, each of the visuals may correspond to a different region or location of a surface of the user device 118. User interaction with the visuals may each cause a different frequency to be output, which may cause the ARFN 102 to perform a particular operation 708 associated with that region of the user device 118. For instance, assume that the visuals correspond to "play," "stop" and "pause" functions associated with rendering a program using the ARFN 102 or a digital video recorder (DVR) device. In these embodiments, each of these operations 708 may be overlaid on different regions of the user device 118. When a particular one of those regions (e.g., play) is actuated by the user 106 (e.g., touched, swiped, etc.), a particular frequency associated with the region may be output and detected by the ARFN 102. Upon detecting the specific operation 708 associated with that frequency, and provided that the ARFN102 is projecting the program within the scene 202, an application or software associated with the ARFN 102 may perform that corresponding operation 708 (e.g., play, stop, or pause the program). Alternatively, the ARFN 102 may cause the DVR device to perform that corresponding operation 708.

The features 702 of the user device 118 may also include buttons or 3D push-button domes that may be actuated (e.g., clicked, depressed, etc.) by the user 106. In certain embodiments, user actuation of the buttons or domes may cause the output of different sounds or frequency of sounds, which may be based on the frequency of user clicks of the buttons or domes. Based at least in part on the frequency of sound output, the ARFN 102 may determine the particular operation 708 associated with that frequency. As a result, the user 106 may interact with different buttons or domes for the purpose of causing specific operations 708 (e.g., adjust volume, adjust brightness, etc.) to occur. In addition, instead of buttons or push-bottom domes, the features 702 may include a slider mechanism (e.g., a slider, a slider bar, etc.) or a zipper. In these embodiments, the ARFN 102 may perform one or more operations 708 in response to the user 106 moving the slider mechanism or zipper, which may each output a different frequency of sound. For instance, moving a slider in a particular direction or for a certain distance may be associated with different operations 708 that may be performed by the ARFN 102. Moreover, when the slider mechanism is moved over a ridge or when the slider mechanism makes contact with a particular object, a certain frequency may be output.

In other embodiments, the thickness or depth of the user device 118 may vary. Then, as the user 106 touches a surface of the user device 118 (e.g., by sliding a finger), a particular frequency of sound may be output based at least in part on the thickness or depth of the region associated with the user actuation. For instance, a thicker region of the user device 118 may output a different frequency of sound than a thinner region of the user device 118. Since different operations 708 may be associated with those frequencies, the user device 118 may include images or text that indicates those particular regions of varied thickness.

The features 702 may also include a knob or switch that are manipulated by the user 106 in order to output a particular sound or frequency. For example, the user 106 may rotate or turn a knob in different directions or for different distances, where rotating the knob in a first direction or for a first distance may output a first frequency, and rotating the knob in the opposite direction or for a different distance may output a second, different frequency of sound. In addition, a knob may also output various sounds (e.g., clicks) as the user 106 turns or moves the knob. As stated above, each of these frequencies may correspond to a different operation 708 that is to be performed by the ARFN 102. Similarly, moving a switch from a first position to a second position, and vice versa, may cause the user device 118 to output different frequencies, and thus cause the ARFN 102 to perform different operations 708. The switch may also make different sounds when the switch is in different positions (e.g., flipped up, flipped down, etc.), where each of those sounds may correspond to different operations 708. In other embodiments, the features 702 may include a joystick that may be moved in different directions, where moving the joystick in each direction may cause a different frequency to be output.

Accordingly, the features 702 may include any type of structure that may output a particular sound, frequency of sound, or change in frequency when the user 106 interacts with those features 702. The ARFN 102 may detect the frequency of sound output and then identify an operation 708 (e.g., adjust the volume or brightness of a device, open/close drapes, turn pages of an e-book, etc.) that corresponds with that particular frequency or change in frequency. Determining the intended operation 708 based on a particular frequency may be determined utilizing automated speech recognition (ASR). This may also be determined based at least in part on the spacing of the passive ridges or between the passive ridges, and the velocity, distance, and direction of the user's 106 hand/finger. In other embodiments, a camera 210 associated with the ARFN 102 may be utilized to identify particular actions or gestures performed by the user 106. Upon identifying the operation 708 intended by the user 106, the ARFN 102 may then cause that operation 708 to occur within the scene 202.

In additional embodiments, the particular sound or frequency that is output by the user device 118 may identify or authenticate one or more users 106 associated with the user device 118. That is, by the particular sound or frequency that is output, the ARFN 102 may be able to detect the user 106 that is causing the user device 118 to output that sound or frequency. For instance, the frequency output (e.g., a particular sound or tone) when a finger is slid across a set of passive ridges may be customized for each user 106 that utilizes the user device 118. In other embodiments, different regions or surfaces of the user device 118 may each correspond to different sounds, tones, of frequencies. Provided that the ARFN 102 is aware of the user 106 that is associated with the different regions or surfaces, the ARFN 102 may identify and/or authenticate the user 106 that is currently interacting with the user device 118 based at least in part on the sound, tone, or frequency that is being output. Accordingly, each user 106 may be associated with a unique identifier that may be utilized for authentication purposes or to detect and perform specific user commands. As a result, the operations 708 performed by the ARFN 102 may include identifying and/or authenticating users 106 that are using the user device 118, as well as other users 106.

In additional embodiments, the ARFN 102 may detect particular sounds or frequencies of sound that may exist within the scene 202 without use of the user device 118. Those sounds may correspond to operations 708 that may occur within the scene 202 and that may be performed by the ARFN 102. For instance, one or more sounds corresponding to beeps from microwave may cause the ARFN 102 to perform a certain operation 708, such as focusing a light over a dining table. Moreover, the sound of a particular door opening or closing may cause the ARFN 102 to perform a different operation 708, such as turning on music within the scene 202. Such sounds or frequencies of sounds, and their corresponding operations 708, may be learned by the ARFN 102 over time such that the user 106 need not always use the user device 118 in order to cause the ARFN 102 to perform certain operations 708.

Figure 8:
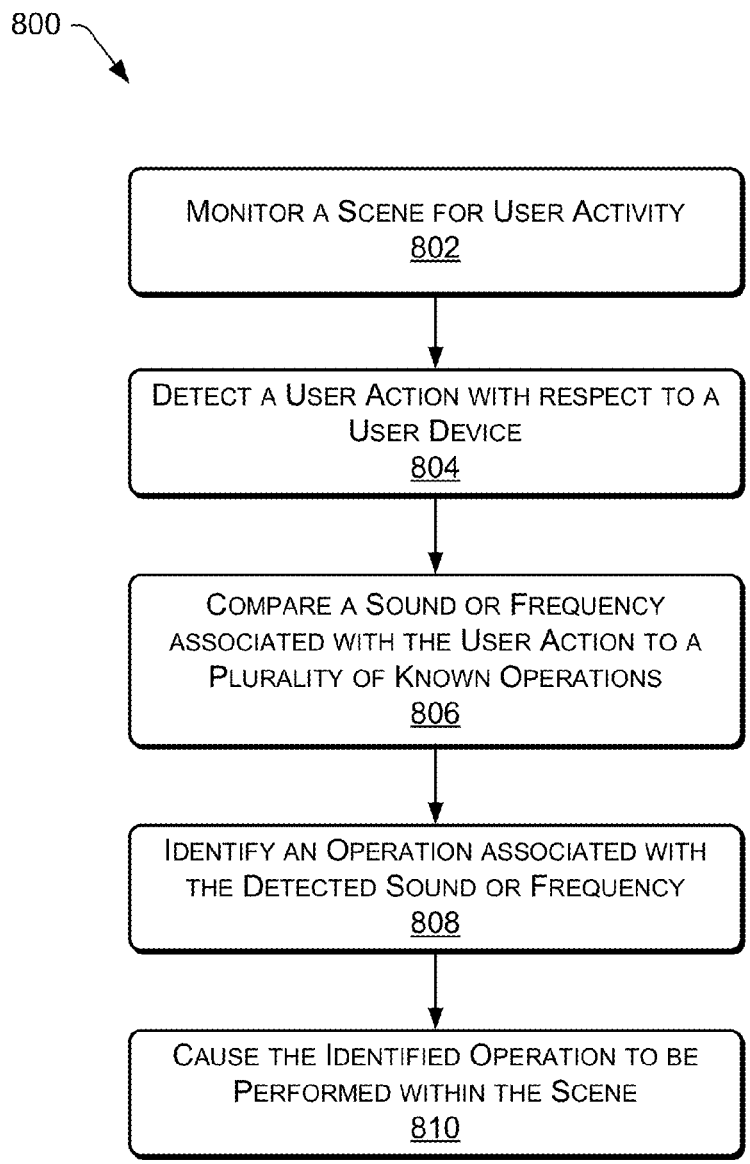
FIG. 8 shows an illustrative flow diagram that describes a process for causing certain operations to occur within a scene based at least in part on user actions associated with a user device.

FIG. 8 shows an illustrative process 800 of performing one or more operations within an environment based at least in part on a user's interaction with a passive user device. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

Block 802 illustrates monitoring a scene for user activity. In some embodiments, the ARFN 102 may monitor a scene 202 (e.g., a room, an environment, etc.) utilizing one or more cameras 210 and/or one or more microphones 218 in order to capture audio or video, respectively, of the scene 202.

Block 804 illustrates detecting a user action with respect to a user device. More particularly, the ARFN 102 may detect a user 106 performing some action with respect to a passive user device 118. In some embodiments, the user device 118 may include one or more features 702, such as grooves, ridges, buttons, sliders, etc. In response to the user 106 interacting with those features 702, the user device 118 or the features 702 themselves may output a particular sound or frequency. Moreover, the outputted sound or frequency may be specific to the particular user action performed. That is, the user 106 may interact with the features 702 in a particular manner for the purposes of causing an intended operation 708 to be performed. Accordingly, instead of detecting the particular user action, the ARFN 102 may instead detect a consequence of the user action, which may be a sound or frequency output.

Block 806 illustrates comparing a sound or frequency associated with the user action to a plurality of known operations. In response to detecting a particular sound or frequency, the ARFN 102 may determine whether that sound or frequency is associated with one or more operations 708 known by the ARFN 102. The ARFN 102 may maintain or have access to a database that maps certain sounds/frequencies to operations 708 that may be performed within the scene 702.

Block 808 illustrates identifying an operation associated with the detected sound or frequency. In some embodiments, based at least in part on the detected sound or frequency, the ARFN 102 may identify a particular operation 708 that corresponds to that sound or frequency. For instance, provided that the user 106 interacted with the features 702 of the user device 118 in a particular manner (e.g., slid a finger across a set of passive ridges), the ARFN 102 may identify the operation 708 (e.g., adjust brightness of a light, adjust volume of a device, etc.) that is associated with that user action. As a result, the ARFN 102 may identify the particular operation 708 that was intended by the user 106.

Block 810 illustrates causing the identified operation to be performed within the scene. Upon identifying the operation 708 associated with the sound or frequency, the ARFN 102 may cause that operation 708 to occur within the environment. For instance, in response to detecting the user action (e.g., pushing a button on the user device 118) and the sound of frequency resulting from that user action, the ARFN 102 may cause that operation 708 (e.g., adjust the volume of a television) to occur within the scene 202.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   memory;
   one or more processors;
   a projector;
   a microphone;
   a passive user device; and
   one or more computer-executable instructions maintained in the memory and executable by the one or more processors to:
      detect, by the microphone, a sound output in association with the passive user device, the sound being output in response to a user interaction with one or more passive ridges on a surface of the passive user device;
      compare the sound to a plurality of known operations; and
      determine that the sound corresponds to at least one operation of the plurality of known operations; and
      the at least one operation to occur by causing the projector to project at least one of light or an image towards a different device, the different device being configured to perform the at least one operation based at least partly on receiving the light or the image.

2. The system as recited in claim 1, wherein the one or more passive ridges are grooves, raised portions, channels, protrusions, or depressions on the surface of the passive user device.

3. The system as recited in claim 1, further comprising a database that maintains a mapping between a plurality of sounds to each of the plurality of known operations.

4. A method comprising:
   detecting, by a microphone associated with a computing device, a sound output in association with a user device based at least in part on a user interaction associated with one or more features of the user device;
   determining an operation that corresponds to the sound; and
   causing the operation to occur by causing a projector associated with the computing device to project at least one of light or an image towards a different device, the different device being configured to perform the operation based at least partly on receiving the light or the image.

5. The method as recited in claim 4, wherein the user device is a passive user device that causes an output of known sounds in response to the user interaction with respect to the one or more features, the known sounds corresponding to different operations.

6. The method as recited in claim 4, wherein the user device is a source of a sound that exists within a scene, and wherein the computing device learns the sound within the scene and a corresponding operation within the scene.

7. The method as recited in claim 4, wherein the sound is a change in frequency of a sound that is captured by the microphone associated with the computing device.

8. The method as recited in claim 4, wherein the sound that is output is based at least in part on a velocity or a direction associated with the user interaction or a distance between individual ones of the one or more features.

9. The method as recited in claim 4, wherein the user interaction further includes one or more gestures that are captured by a camera associated with the computing device, the one or more gestures and the sound being utilized to determine the operation to be performed.

10. The method as recited in claim 4, wherein the one or more features include one or more passive ridges situated on a surface of the user device, and wherein the user interaction includes a swipe associated with the one or more passive ridges.

11. The method as recited in claim 10, wherein the sound or a change in a frequency of sound output in response to the swipe is based at least in part on a velocity of the swipe, a change in velocity of the swipe, a direction of the swipe, a distance of the swipe, a pattern of the swipe, a height of the one or more passive ridges, a distance between the one or more passive ridges, or a width of the one or more passive ridges.

12. The method as recited in claim 4, wherein the one or more features include at least one of:
   one or more passive ridges;
   a thickness of different regions of the user device;
   one or more buttons or domes;
   one or more clickers;
   one or more slider mechanisms;
   one or more knobs;
   one or more switches; or
   one or more visuals overlaid on the user device.

13. A method comprising:
   detecting, by a microphone associated with a computing device, a sound output in association with a passive user device, the sound being output based at least in part on a user interaction with one or more passive ridges situated on a surface of the passive user device;
   comparing the sound to at least one known operation;
   determining that the at least one known operation corresponds to the sound; and
   causing the at least one known operation to occur by causing a projector associated with the computing device to project at least one of light or an image towards a different device, the different device being configured to perform the at least one known operation based at least partly on receiving the light or the image.

14. The method as recited in claim 13, wherein the user interaction corresponds to a swipe across the one or more passive ridges, and wherein the sound that is output and the at least one known operation is based at least in part on a velocity of the swipe, a change in velocity of the swipe, a direction of the swipe, a distance of the swipe, a pattern of the swipe, a height of the one or more passive ridges, a distance between the one or more passive ridges, or a width of the one or more passive ridges.

15. The method as recited in claim 13, wherein a distance between the one or more passive ridges varies incrementally such that the sound that is output is a change in frequency resulting from the swipe.

16. The method as recited in claim 13, wherein the at least one known operation includes adjusting a parameter of the computing device or a parameter of one or more devices included within a scene.

17. A system comprising:
memory;
one or more processors;
a projector;
a microphone; and
one or more computer-executable instructions maintained in the memory and executable by the one or more processors to:
  detect, by the microphone, a sound output in association with a user device, the sound being based at least in part on a user interaction with one or more features of the user device;
  determine an operation that corresponds to the sound; and
  cause the operation to occur by causing the projector to project at least one of light or an image towards a different device, the different device being configured to perform the operation based at least partly on receiving the light or the image.

18. The system as recited in claim 17, wherein the sound includes a change in frequency of the sound that is output in response to the user interaction with respect to the one or more features.

19. The system as recited in claim 17, wherein the one or more computer-executable instructions are further executable by the one or more processors to determine the operation by comparing the sound to at least one known operation associated with a scene in which the operation is to occur.

20. The system as recited in claim 17, wherein the system further comprises the user device, and wherein the one or more features include one or more passive ridges, and wherein the user interaction is a swipe associated with the one or more passive ridges.

21. The system as recited in claim 20, wherein the operation is determined based at least in part on a velocity of the swipe, a change in velocity of the swipe, a direction of the swipe, a distance of the swipe, a pattern of the swipe, a height of the one or more passive ridges, a distance between the one or more passive ridges, or a width of the one or more passive ridges.

22. The system as recited in claim 17, wherein the system further comprises the user device, and wherein the one or more features include one or more visuals overlaid on a surface of the user device, and wherein the user interaction is a user selection with respect to at least one of the one or more visuals.

23. The system as recited in claim 17, wherein the system further comprises the user device, and wherein the one or more features include one or more buttons, domes, or clickers on a surface of the user device, and wherein the user interaction is a user selection with respect to at least one of the one or more buttons or domes.

24. The system as recited in claim 17, wherein the system further comprises the user device, and wherein the one or more features include a slider mechanism on a surface of the user device, and wherein the user interaction is moving the slider mechanism from a first position to a second position.

25. The system as recited in claim 17, wherein the system further comprises the user device, and wherein the one or more features include a switch on a surface of the user device, and wherein the user interaction is moving the switch from a first position to a second position.

26. The system as recited in claim 17, wherein the system further comprises the user device, and wherein the one or more features include a knob on a surface of the user device, and wherein the user interaction is rotating the knob from a first position to a second position.

27. The system as recited in claim 17, wherein the output is based at least in part on a thickness of the user device at a region that corresponds to the user interaction.

28. The method as recited in claim 4, wherein the physical object is a consumer device different from the computing device, and wherein the causing further comprises instructing, by the computing device, the consumer device to at least one of adjust a volume or adjust a brightness of the consumer device.

* * * * *